US011568314B2

(12) United States Patent
Wan et al.

(10) Patent No.: US 11,568,314 B2
(45) Date of Patent: Jan. 31, 2023

(54) DATA-DRIVEN ONLINE SCORE CACHING FOR MACHINE LEARNING

(71) Applicant: Microsoft Technology Licensing, LLC, Redmond, WA (US)

(72) Inventors: Qingyun Wan, Sunnyvale, CA (US); Qing Duan, Santa Clara, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 423 days.

(21) Appl. No.: 16/787,248

(22) Filed: Feb. 11, 2020

(65) Prior Publication Data
US 2021/0248509 A1 Aug. 12, 2021

(51) Int. Cl.
G06N 20/00 (2019.01)
G06F 12/0893 (2016.01)
G06F 12/0871 (2016.01)

(52) U.S. Cl.
CPC ......... *G06N 20/00* (2019.01); *G06F 12/0871* (2013.01); *G06F 12/0893* (2013.01)

(58) Field of Classification Search
CPC ............. G06F 12/0871; G06F 12/0893; G06F 16/24552; G06Q 10/06393; G06N 20/00
See application file for complete search history.

(56) References Cited

U.S. PATENT DOCUMENTS

2010/0318538 A1* 12/2010 Wyman ............... G06F 16/3349
707/769

OTHER PUBLICATIONS

Zhong, Chen, M. Cenk Gursoy, and Senem Velipasalar. "A deep reinforcement learning-based framework for content caching." 2018 52nd Annual Conference on Information Sciences and Systems (CISS). IEEE, 2018. (Year: 2018).*

* cited by examiner

*Primary Examiner* — Kalpit Parikh
(74) *Attorney, Agent, or Firm* — NDWE, LLP

(57) ABSTRACT

The disclosed embodiments provide a system for processing scoring requests. During operation, the system matches an identifier for an entity in a scoring request to a cache entry in a score cache. Next, the system retrieves, from the cache entry, a previous value of a score generated by a machine learning model from previous values of features for the entity and a first encoded representation of the previous values of a subset of the features with greater than a threshold effect on the score. The system then compares the first encoded representation with a second encoded representation of the most recent values of the subset of the features for the entity. When the comparison indicates that the most recent values match the previous values, the system outputs the previous value of the score for the entity in a response to the scoring request.

19 Claims, 4 Drawing Sheets

DATA-DRIVEN ONLINE SCORE CACHING FOR MACHINE LEARNING

BACKGROUND

Field

The disclosed embodiments relate to machine learning. More specifically, the disclosed embodiments relate to techniques for performing data-driven online score caching for machine learning.

Related Art

Analytics is commonly used to discover trends, patterns, relationships, and/or other attributes related to large sets of complex, interconnected, and/or multidimensional data. In turn, the discovered information is used to derive insights and/or guide decisions or actions related to the data.

To glean such insights, large datasets of features are analyzed using regression models, artificial neural networks, support vector machines, decision trees, naïve Bayes classifiers, and/or other types of machine learning models. The discovered information can then be used to guide decisions and/or perform actions related to the data. For example, the output of a machine learning model is used to guide marketing decisions, assess risk, detect fraud, predict behavior, and/or customize or optimize use of an application or website.

However, significant time, effort, and overhead are spent on feature selection during creation and training of machine learning models models for analytics. For example, a data set for a machine learning model may have thousands to millions of features, including features that are created from combinations of other features, while only a fraction of the features and/or combinations may contribute significantly to the output of the machine learning model. At the same time, training and/or execution of machine learning models with large numbers of features and/or large data sets typically require more memory, computational resources, and time than those of machine learning models with smaller numbers of features or data sets.

The use of complex machine learning models with large data sets and/or numbers of features presents additional challenges in online environments, where machine learning output is generated in a real-time or near-real-time basis (e.g., in response to recent user actions or newly received data). For example, an online system uses machine learning models to generate scores that are used to select and display products, services, goods, and/or other entities to users while the users interact with the online system. When a request for these scores is received, a service in the online system retrieves features as input to one or more machine learning models, applies the machine learning models to the features to generate the scores, and returns the scores in response to the request. The service is additionally required to respond to the request within the latency limit specified in a service level agreement (SLA) for the service. As a result, the service may have difficulty scaling and/or meeting the latency requirement as the number of requests and/or number of scores produced in response to each request increase.

Consequently, machine learning and/or analytics may be facilitated by mechanisms for improving resource consumption, latency, and/or scalability associated with large-scale and/or online scoring by machine learning models.

BRIEF DESCRIPTION OF THE FIGURES

In the figures, like reference numerals refer to the same figure elements.

DETAILED DESCRIPTION

Figure 1:
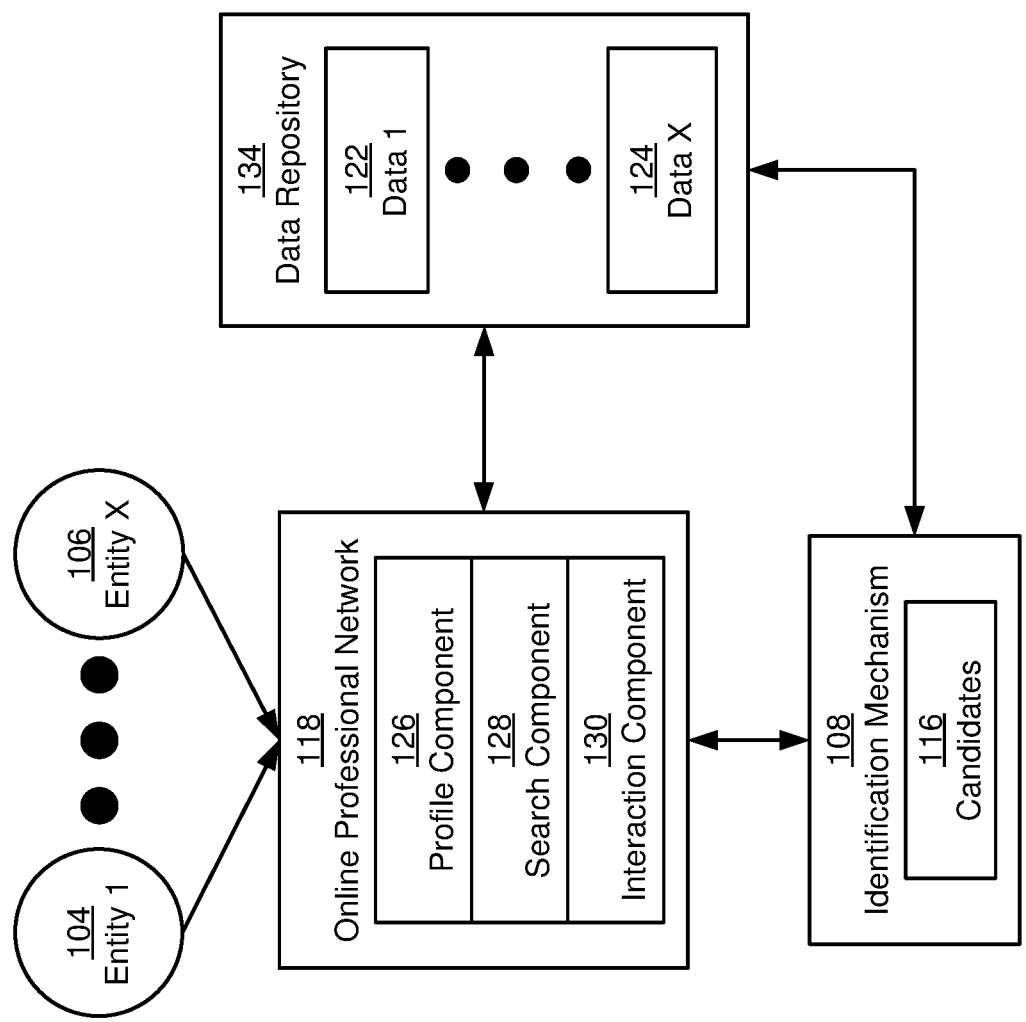
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for processing scoring requests for scores produced by machine learning models. For example, the scores include relevance scores that represent predicted likelihoods of positive outcomes between or among users, jobs, content, goods, services, companies, schools, businesses, and/or other entities.

In some embodiments, the scoring requests are generated in an online or on-demand basis, which requires responses to the scoring requests to be produced in real-time or near-real-time. When the responses are not received in a timely manner, the accuracy of output produced from the scores and/or user experiences related to the output are negatively impacted. For example, a scoring request for relevance scores between a user and a set of posted or described jobs is received after the user performs a job search in an online system. If the scoring request does not receive a response within a specified timeout, job postings are displayed to the user without the relevance scores, which reduces the quality or relevance of the jobs to the user. Conversely, a longer timeout allows the job postings to be outputted to the user based on the relevance scores but may cause the user to experience a perceptible delay before the job postings are loaded.

To expedite the online processing of scoring requests for scores from machine learning models, cached scores produced by the machine learning models at earlier times are selectively returned in responses to the scoring requests. When a scoring request for a score from a machine learning model is received, one or more entities (e.g., a user and a set of posted jobs) in the request are matched to entries in one or more caches. The entries store a previous value of the score produced by the machine learning model for the entities (e.g., during processing of a previous scoring request for the same entities), as well as previous values of features used by the machine learning model to produce the previous value of the score. If entries for the entities cannot be found in the cache(s), the score is calculated by the machine learning model using the latest values of the features and returned in a response to the scoring request.

If cache entries for the entities are available, one or more comparisons involving data from the cache(s) are performed to determine a scoring method used to process the scoring request. First, the previous values of the most important features from the cache entries are compared with the latest values of the same features for the entities. If the previous values are not identical to the latest values, the score is calculated using the latest values of the features and returned in a response to the scoring request.

If the previous values are identical to the latest values, one or more times to live (TTLs) associated with the previous values of the features and/or score are compared to the current time to determine if any of the previous values have expired. If no previous values have expired, the previous value of the score is returned in response to the scoring request instead of recalculating the score using the latest values of the features. If any of the previous values have expired, the score is calculated using the latest values of the features and returned in a response to the scoring request.

By serving cached scores that were previously generated by machine models during processing of scoring requests for the scores, the disclosed embodiments reduce computational overhead, resource consumption, and/or latency over conventional techniques that execute machine learning models to produce a new set of scores every time a scoring request is received. At the same time, regular invalidation of the cached scores is enforced through comparisons of the latest feature values associated with the scoring requests with previous feature values used to produce the cached scores and/or TTLs for the previous feature and/or score values. As a result, cached scores returned in response to the scoring requests are verified to be relatively fresh, which maintains the accuracy and/or relevance of recommendations, insights, and/or other output that is generated based on the scores. Consequently, the disclosed embodiments improve computer systems, applications, user experiences, tools, and/or technologies related to executing machine learning models and/or processing requests.

Online Score Caching for Machine Learning

FIG. 1 shows a schematic of a system in accordance with the disclosed embodiments. As shown in FIG. 1, the system includes an online network 118 and/or other user community. For example, online network 118 includes an online professional network that is used by a set of entities (e.g., entity 1 104, entity x 106) to interact with one another in a professional and/or business context.

The entities include users that use online network 118 to establish and maintain professional connections, list work and community experience, endorse and/or recommend one another, search and apply for jobs, and/or perform other actions. The entities also, or instead, include companies, employers, and/or recruiters that use online network 118 to list jobs, search for potential candidates, provide business-related updates to users, advertise, and/or take other action.

Online network 118 includes a profile component 126 that allows the entities to create and edit profiles containing information related to the entities' professional and/or industry backgrounds, experiences, summaries, job titles, projects, skills, and so on. Profile component 126 also allows the entities to view the profiles of other entities in online network 118.

Profile component 126 also, or instead, includes mechanisms for assisting the entities with profile completion. For example, profile component 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search component 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction component 130 that allows the entities to interact with one another on online network 118. For example, interaction component 130 may allow a user, company, school, or other entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or features. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 is logged and stored in a database, data warehouse, cloud storage, and/or other data-storage mechanism providing data repository 134.

Data in data repository 134 is then used to generate recommendations and/or other insights related to listings of jobs or opportunities within online network 118. For example, one or more components of online network 118 may log searches, clicks, views, text input, conversions, and/or other feedback during the entities' interaction with a job search tool in online network 118. The feedback may be stored in data repository 134 and used as training data for one or more machine learning models, and the output of the machine learning model(s) may be used to display and/or otherwise recommend jobs, advertisements, posts, articles, connections, products, companies, groups, and/or other types of content, entities, or actions to registered users of online network 118.

More specifically, data in data repository 134 and one or more machine learning models are used to produce rankings of candidates associated with jobs or opportunities listed within or outside online network 118. As shown in FIG. 1, an identification mechanism 108 identifies candidates 116 associated with the opportunities. For example, identification mechanism 108 identifies candidates 116 as users who have viewed, searched for, and/or applied to jobs, positions, roles, and/or opportunities, within or outside online network 118. Identification mechanism 108 also, or instead, identifies candidates 116 as registered users of online network 118 with skills, work experience, and/or other attributes or qualifications that match the corresponding jobs, positions, roles, and/or opportunities.

After candidates 116 are identified, profile and/or activity data of candidates 116 are inputted into the machine learning model(s), along with features and/or characteristics of the corresponding opportunities (e.g., required or desired skills, education, experience, industry, title, etc.). The machine learning model(s) then output scores representing the strengths of candidates 116 with respect to the opportunities and/or qualifications related to the opportunities (e.g., skills, current position, previous positions, overall qualifications, etc.). For example, the machine learning model(s) generate scores based on similarities between the candidates' profile data with online network 118 and descriptions of the opportunities. The model(s) further adjust the scores based on social and/or other validation of the candidates' profile data (e.g., endorsements of skills, recommendations, accomplishments, awards, patents, publications, reputation scores, etc.). The rankings are then generated by ordering candidates 116 by descending score.

In turn, rankings based on the scores and/or associated insights improve the quality of candidates 116, recommendations of opportunities to candidates 116, and/or recommendations of candidates 116 for opportunities. Such rankings may also, or instead, increase user activity with online network 118 and/or guide the decisions of candidates 116 and/or moderators involved in screening for or placing the opportunities (e.g., hiring managers, recruiters, human resources professionals, etc.). For example, one or more components of online network 118 may display and/or otherwise output a user's position (e.g., top 10%, top 20 out of 138, etc.) in a ranking of candidates for a job to encourage the user to apply for jobs in which the user is highly ranked. In a second example, the component(s) may account for a user's relative position in rankings for a set of jobs during ordering of the jobs as search results in response to a job search by the user. In a third example, the component(s) may output a ranking of candidates 116 for a given set of job qualifications as search results to a recruiter after the recruiter performs a search with the job qualifications included as parameters of the search. In a fourth example, the component(s) may output jobs to a user based on the predicted relevance or attractiveness of the jobs to the user and/or the user's likelihood of applying to the jobs.

In one or more embodiments, online network 118 includes functionality to generate scores and/or rankings of recommendations related to candidates 116, opportunities, and/or other entities in a real-time, near-real-time, or on-demand basis. In these embodiments, the scores and/or rankings are generated in response to recent activity or actions by or involving the entities.

For example, online network 118 includes a service that uses a machine learning model to generate a set of relevance scores representing the compatibility of a user with a set of jobs (or the compatibility of a set of users as candidates 116 for a job). The service receives a scoring request in response to the user's job search (or a recruiter's search for candidates 116 matching a job), the user accessing a job recommendation component in online network 118, and/or the user otherwise interacting with job-related functionality in online network 118. To improve the accuracy of the scores, the service inputs, into the machine learning model, features that reflect the latest activity by the user (or recruiter), such as features representing the user's searches, clicks, likes, dislikes, and/or other actions performed in the same user session as the user's interaction with the job-related functionality. In response to the inputted features, the machine learning model calculates the relevance scores between the user and jobs (or a set of candidates 116 and a job) in a real-time or near-real-time basis (e.g., with a latency that is within a limit specified in a service level agreement (SLA) for the service). The service returns the relevance scores in a response to the scoring request, and online network 118 outputs, to the user, a ranking of jobs (or candidates) by descending relevance score as search results, recommendations, and/or other representations of the jobs (or candidates).

Those skilled in the art will appreciate that online network 118 may perform on-demand scoring and/or ranking related to other types or combinations of entities. For example, online network 118 may receive one or more scoring requests for relevance scores between a user and content items created and/or shared by other users of the online network 118. These content items include, but are not limited to, posts, articles, comments, updates, and/or videos. The scoring request(s) may be generated in response to the user accessing a content feed in a homepage, landing page, and/or another part of online network 118. After the relevance scores are produced by one or more machine learning models, one or more rankings of content items by the relevance scores are generated and/or blended into a content feed for the user. Because the content items are scored and ranked in real-time or near-real-time, the content feed is able to reflect the latest content posted to online network 118 and/or user interactions with the content in online network 118.

In another example, online network 118 may generate a scoring request for relevance scores between a user and other registered users of online network 118 in response to the user accessing a "People You May Know" feature in online network 118. A service processes the scoring request by generating relevance scores between the user and the other registered users based on features that include the user's latest set of connections and/or connection requests in online network 118. The other registered users are then ranked by descending relevance score, and the ranking is outputted as connection recommendations to the user within the People You May Know" feature.

Figure 2:
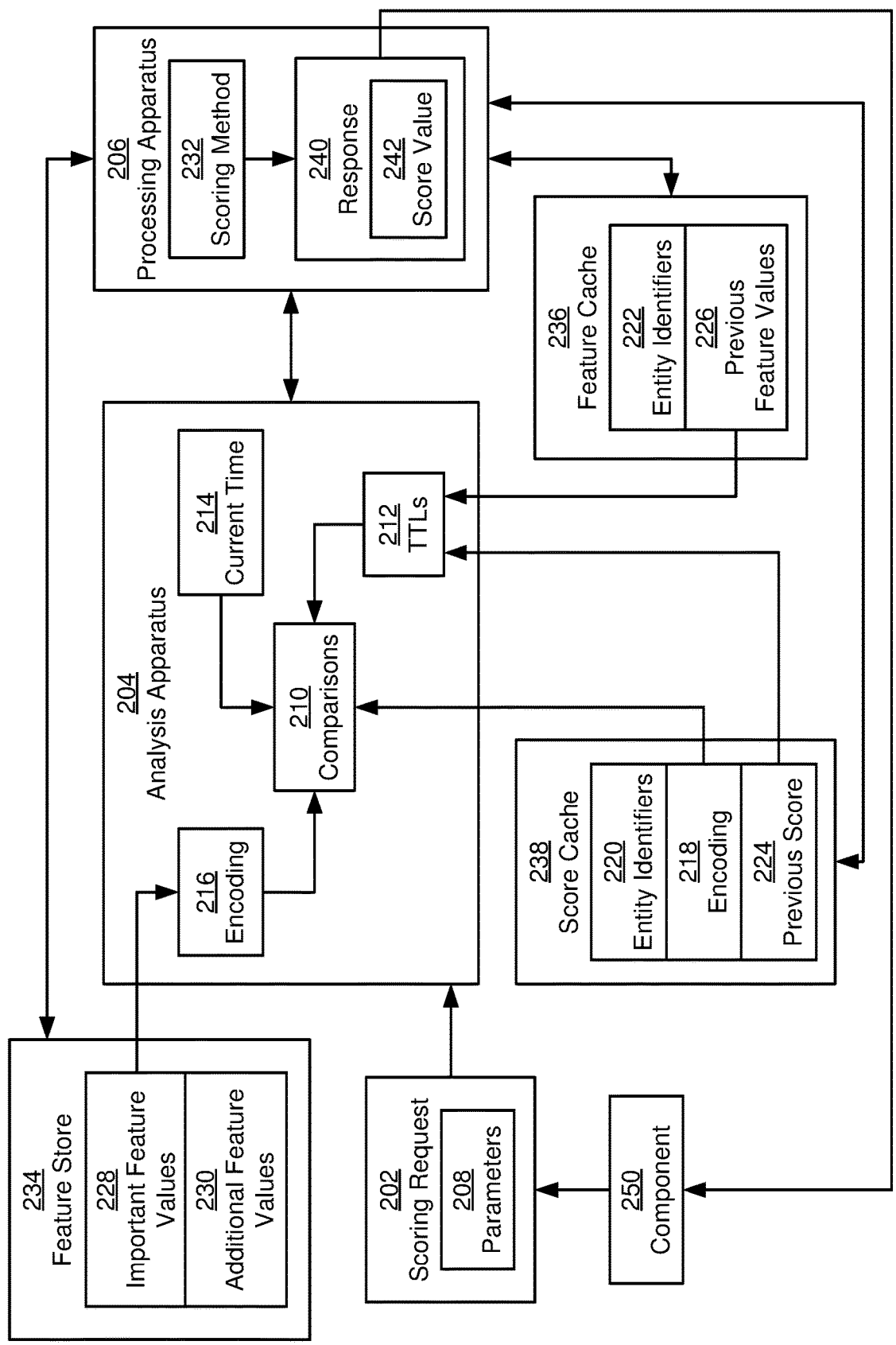
FIG. 2 shows a system for processing a scoring request in accordance with the disclosed embodiments.

To reduce latency and/or resource overhead associated with generating these types of scores for large numbers of requests and/or entities, online network 118 uses a cache of the scores to process some or all requests for the scores. As shown in FIG. 2, a system for processing a scoring request 202 includes an analysis apparatus 204 and a processing apparatus 206, which are coupled to a feature store 234, a feature cache 236, and a score cache 238. Each of these components is described in further detail below.

Analysis apparatus 204 receives scoring request 202 in response to recent activity in an online system (e.g., online network 118 of FIG. 1). For example, scoring request 202 is generated in response to interaction between a user of the online system and a component 250 (e.g., search, job search, job recommendation, recruiting, connection recommendation, etc.) that displays results (e.g., users, jobs, companies, schools, content, advertisements, goods, services, etc.) that are tailored to the user's preferences, interests, experience, or background. Scoring request 202 may be generated by component 250 and/or a downstream service that is called by component 250.

Scoring request 202 includes parameters 208 that are used to generate results related to the recent activity. For example, scoring request 202 is generated in response to the user accessing or interacting with a job search or job recommendation component in the online system. Parameters 208 of scoring request 202 include, but are not limited to, identifiers for the user, identifiers for one or more jobs that are potentially relevant to the user, and an optional identifier for a machine learning model used to calculate relevance scores between users and jobs. The user's identifier may be obtained from data that is generated after the user logs in to the online system (e.g. by matching authentication credentials for the user to the user's unique identifier in a registered user data repository). The job identifiers may be obtained by matching titles, skills, seniorities, locations, and/or other attributes in job postings or descriptions to corresponding attributes of the user in profile data for the user and/or a search term inputted by the user during a job search. The identifier for the machine learning model may be obtained as the identifier for the latest version of the machine learning model used to generate scores between users and jobs, the identifier for a version of the machine learning model that is personalized to the user, and/or the identifier for a version of the machine learning model to which the user and/or jobs are assigned in an A/B test.

Analysis apparatus 204 uses data in feature store 234, feature cache 236, and/or score cache 238 to determine a scoring method 232 used to process scoring request 202. Feature store 234 includes the latest values of features used as input into the machine learning model. For example, feature store 234 includes a service that retrieves the latest feature values mapped to identifiers in parameters 208 from a distributed filesystem and/or other type of data store. The service also, or instead, generates calls to downstream services that produce the latest feature values in an on-demand basis.

Feature cache 236 stores a cache entry containing mappings of entity identifiers 222 that can be specified in parameters 208 to previous feature values 226 used to process a previous scoring request for the same parameters 208. For example, the cache entry includes entity identifiers 222 for a user and one or more jobs, which are mapped to previous feature values 226 related to the user and job(s). The cache entry may be created and populated with previous feature values 226 after a previous scoring request containing the identifiers is processed using previous feature values 226. The cache entry in feature cache 236 expedites retrieval of the features during processing of scoring request 202 and/or other subsequent scoring requests.

Similarly, score cache 238 stores a cache entry containing a mapping of entity identifiers 220 with the same values as entity identifiers 222 to a previous score 224 produced from previous feature values 226 during processing of the previous scoring request. Score cache 238 additionally includes an encoding 218 of previous feature values 226. For example, encoding 218 includes a hash value, character encoding, Gödel numbering, embedding, checksum, and/or other compact representation of previous feature values 226. In some embodiments, encoding 218 is calculated from previous feature values 226 during calculation of previous score 224 by the system. Encoding 218 is then stored in the same cache entry in score cache 238 as previous score 224 to expedite processing of a subsequent scoring request 202 for the same parameters 208, as described in further detail below. For example, the cache entry in score cache 238 includes entity identifiers 220 for a user and one or more jobs, which are mapped to encoding 218 of previous feature values 226 used to produce previous score 224 and the value of previous score 224. The cache entry may be created and populated with the identifiers, encoding 218, and previous score 224 after the previous scoring request containing the identifiers is processed.

In one or more embodiments, analysis apparatus 204 determines scoring method 232 based on one or more comparisons 210 of data from feature store 234, feature cache 236, and/or score cache 238. First, analysis apparatus 204 retrieves the data by performing a lookup of feature store 234, feature cache 236, and score cache 238 using identifiers in parameters 208. If no cache entries in score cache 238 or feature cache 236 include identifiers for parameters 208, analysis apparatus 232 specifies calculation of a new score value 242 for parameters 208 as scoring method 232. In turn, processing apparatus 206 applies the machine learning model to the latest values of features for parameters 208 from feature store 234 to produce score value 242. Processing apparatus 206 then transmits, to component 250 and/or the originator of scoring request 202, a response 240 to scoring request 202 that contains score value 242.

If cache entries for identifiers in parameters 208 exist in score cache 238 and feature cache 236, analysis apparatus 204 performs a first comparison of important feature values 228 for parameters 208 from feature store 234 with corresponding previous feature values 226 for the same parameters 208 from feature cache 236 and/or score cache 238. In one or more embodiments, important feature values 228 include the latest values of a set of "most important" features that are identified as having greater than a threshold effect on the performance or output of the machine learning model. For example, the most important features include a predetermined number of features with the largest impact on the accuracy of the machine learning model and/or a variable number of features that impact the accuracy of the machine learning model by more than a threshold.

In some embodiments, analysis apparatus 204 and/or another component of the system use a feature-interpretation technique to identify the most important features for the machine learning model. For example, the component determines the importance of each feature of the machine learning model by randomizing the feature's value in validation data for the machine learning model. Next, the component calculates the difference between the error of the machine learning model with the randomized value in the validation data and the error of the machine learning model with the original feature value in the validation data. The component then ranks the features by descending difference in error, so that features with a greater effect on the error are ranked ahead of features with a lesser effect on the error. Finally, the component applies a numeric, percentile, and/or another threshold to the difference in error to identify a subset of the features as the most important features (e.g., so that 20% of features with the greatest impact on the error of the machine learning model are identified as the most important features).

To compare important feature values 228 with previous feature values 226, analysis apparatus 204 obtains encoding 218 of previous feature values 226 from score cache 238. Analysis apparatus 204 also applies the same technique (e.g., hash function, embedding model, etc.) used to generate encoding to important features values 228 to produce a separate encoding 216 of important feature values 228. If encodings 216-218 differ from one another, one or more important features mapped to identifiers in parameters 208 have changed since the calculation of previous score 224. If encodings 216-218 are the same, none of the important features have changed since previous score 224 was calculated. Consequently, analysis apparatus 204 uses encodings 216-218 as compact representations of important feature values 226 and the corresponding previous feature values 226. These compact representations can be stored in a fixed amount of memory and/or quickly compared to detect changes in important features values 226 since previous score 224 was calculated.

If any of the important features have changed since previous score 224 was calculated, analysis apparatus 204 specifies recalculation of the score as scoring method 232. Processing apparatus 206 carries out scoring method 232 by inputting important feature values 228 and additional feature values 230 (e.g., the latest values of features that are less important to the output of the machine learning model) for parameters 208 into the machine learning model, obtaining score value 242 as output of the machine learning model, and returning score value 242 in response 240 to scoring request 202.

If none of the important features have changed since the time at which previous score 224 was calculated, analysis apparatus 204 performs one or more comparisons 210 of TTLs 212 associated with previous score 224 and/or previous feature values 226 used to calculate previous score 224 with a current time 214. In some embodiments, TTLs 212 include counters, timestamps, or other representations of lifespans of previous score 224, previous feature values 226, and/or other data used by the system. If current time 214 has exceeded the TTL for a particular piece of data, the piece of data is determined to be expired. In turn, if comparisons 210 of TTLs 212 with current time 214 indicate that previous score 224 or any previous feature values 226 used to calculate previous score 224 have expired, analysis apparatus 204 specifies calculation of a new score value 242 for parameters 208 as scoring method 232.

If comparisons 210 of TTLs 212 with current time 214 indicate that previous score 224 and/or all previous feature values 226 used to calculate previous score 224 are still valid, processing apparatus 206 sets scoring method 232 to reuse of previous score 224. In turn, processing apparatus 206 retrieves previous score 224 from analysis apparatus 204, score cache 238, and/or another component and returns previous score 224 as score value 242 in response 240.

In one or more embodiments, TTLs 212 include a TTL for previous score 224 and/or one or more TTLs for individual previous feature values 226 and/or groups of previous feature values 226. For example, previous score 224 includes a TTL that is set to a number of hours, days, and/or another period after the creation of previous score 224. Individual features associated with previous feature values 226 have TTLs 212 that vary with the frequency with which the features change (e.g., a feature that measures user activity over an hour has a shorter TTL than a feature that measures user activity over a day or week).

Continuing with the above example, previous feature values 226 include a group of "least important" features (e.g., features with less than a threshold effect on the resulting score produced by the machine learning model). During comparisons 210 of TTLs 212 with current time 214, analysis apparatus 204 sets the TTL of each feature in the "least important" group to the TTL of previous score 224. As a result, previous feature values 226 of the least important features expire only when the corresponding previous score 224 expires.

Continuing with the above example, previous feature values 226 include another group of "middle importance" features that lie between the most important features and the least important features (e.g., features with effects on the machine learning model that fall between the two thresholds associated with the most important and least important features). Thus, if the most important features include 20% of features with the highest effect on the score produced by the machine learning model and the least important features include 20% of features with the lowest effect on the score produced by the machine learning model, the "middle importance" features include the remaining 60% of features that are not included in the most important or least important features. During comparisons 210, analysis apparatus 204 uses the TTL of each feature in the "middle importance" group to determine if the corresponding previous feature value has expired. If current time 214 does not exceed any TTLs 212 of previous feature values 226 in the middle importance group or the TTL of previous score 224, previous score 224 is still valid and can be returned in response 240 to scoring request 202. If current time 214 exceeds one or more TTLs 212 of previous feature values 216 in this group or the TTL of previous score 224, previous score 224 is invalidated, and processing apparatus 206 generates a new score value 242 for parameters 208 and returns the new score value 242 in response 240.

After a new score value 242 is produced, analysis apparatus 204, processing apparatus 206, and/or another component of the system replace previous score 224 in the cache entry for parameters 208 in score cache 238 with the new score value 242. The component also updates encoding 218 in the cache entry with the value of encoding 216, which was calculated from important feature values 228 used to produce the new score value 242. Similarly, the component replaces previous feature values 226 in the cache entry for entity identifiers 222 found in parameters 208 in feature cache 236 with important feature values 228 and/or additional feature values 230 used to produce the new score value 242. The component also updates TTLs 212 to reflect the new previous score 224 and encoding 218 in score cache 238 and the new previous feature values 226 in feature cache 236. As a result, entries for entities represented by parameters 208 in score cache 238 and feature cache 236 reflect the newest score value 242 and feature values used to calculate score value 242, which allows one or more subsequent scoring requests 202 for the same parameters 208 to be processed using comparisons 210 related to the newest score value 242 and feature values.

In some embodiments, TTLs 212 for previous score 224 and/or previous feature values 226, encoding 218, the sizes of score cache 238 and feature cache 236, and/or other factors that affect the functioning of the system are manually tuned and/or set based on rules and/or formulas related to patterns for receiving scoring request 202, updates to scores or feature values used in processing scoring request 202, the sizes of score cache 238 and/or feature cache 236, and/or computational resources available to calculate scores in response to scoring requests. For example, a TTL for previous score 224 is calculated based on a formula, heuristic, or function that includes, as input, the size of score cache 238, the latency or throughput associated with calculating a new score on available resources, the typical (e.g., average, median, etc.) reduction in model accuracy as a function of score staleness, and/or the importance of the score to functionality or goals (e.g., search result or recommendation accuracy, user engagement, revenue, etc.) related to use of the score in the online system. In another example, a TTL for a given previous feature value is calculated based on a formula, heuristic, or function that includes, as input, the impact of the feature on the resulting score, the time period over which the feature changes (e.g., hourly, daily, weekly, etc.), the latency associated with retrieving the latest value of the feature, and/or the size of feature cache 236. In a third example, a hash function and/or another method for calculating encodings 216-218 is selected to balance the resource overhead or complexity associated with calculating encoding 218 with the likelihood of collisions between encodings 216 and 218.

In general, these factors are selected or tuned to balance the tradeoff between implementation overhead (e.g., scalability, resource limits, latency, throughput, etc.) and the accuracy of scores returned in response to scoring request 202. A longer list of important feature values 228 incurs greater resource and system overhead (e.g. due to more frequent calculation of scores, retrieval of feature values, and/or more complex calculation of encodings 216-218) but results in "fresher" and more accurate scores. Conversely, a longer list of additional feature values 230 reduces resource and system overhead (e.g., due to less frequent calculation of scores and retrieval of additional feature values 230) but reduces the accuracy or recency of scores. A more complicated hash function or technique for calculating encodings 216-218 increases resource consumption and/or latency but reduces the likelihood of collisions between encodings 216 and 218, and in turn, the probability that changes to important feature values 228 are not detected. A longer feature or score TTL reduces overhead (e.g., by reducing the recalculation of scores and/or retrieval of the latest feature values) but also reduces the accuracy and/or recency of the scores.

By serving cached scores that were previously generated by machine models during processing of scoring requests for the scores, the system of FIG. 2 reduces computational overhead, resource consumption, and/or latency over conventional techniques that execute machine learning models to produce a new set of scores every time a scoring request is received. For example, around 62% of user-job pairs in second and subsequent scoring requests result in cache hits in score cache 238 within an hour of the first scoring request for the same user-job pairs. With a latency of up to 5 ms in reading from score cache 238 and a $95^{th}$ percentile latency of 50 ms in calculating a new score, the system produces an average latency of 40%*(50+5) ms+60%*5 ms, or 25 ms, which is about half of the $95^{th}$ percentile scoring latency.

At the same time, regular invalidation of the cached scores is enforced through comparisons of the latest feature values associated with the scoring requests with previous feature values used to produce the cached scores and/or TTLs for the previous feature and/or score values. As a result, cached scores returned in response to the scoring requests are verified to be relatively fresh (e.g., calculated within a window from the current time or from important feature values 228 that are up-to-date), which maintains the accuracy and/or relevance of recommendations, insights, and/or other output that is generated based on the scores. In contrast, techniques that do not enforce TTLs for features and/or scores can return stale (e.g., older or out-of-date) scores that do not reflect the latest user activity and/or preferences. These scale scores may cause the same results (e.g., search results, recommendations, etc.) to be repeated returned in response to scoring requests for the same user, which reduces the user's ability to discover new results and/or effectively utilize the functionality (e.g., search, recommendation, etc.) associated with the scoring requests and/or results. Consequently, the disclosed embodiments improve computer systems, applications, user experiences, tools, and/or technologies related to executing machine learning models and/or processing requests.

Those skilled in the art will appreciate that the system of FIG. 2 may be implemented in a variety of ways. First, analysis apparatus 204, processing apparatus 206, feature store 234, feature cache 236, and/or score cache 238 may be provided by a single physical machine, multiple computer systems, one or more virtual machines, a grid, one or more clusters, one or more databases, one or more filesystems, and/or a cloud computing system. Analysis apparatus 204 and processing apparatus 206 may additionally be implemented together and/or separately by one or more hardware and/or software components and/or layers.

Second, data in feature cache 236 and score cache 238 may be stored and/or retrieved in multiple ways. For example, feature cache 236 and score cache 238 may be merged into a single cache, or data in feature cache 236 and score cache 238 may be divided among multiple caches. In another example, feature cache 236 may be omitted if feature store 234 has sufficient bandwidth or speed to serve the latest feature values for all scoring requests received by the system. In this instance, TTLs 212 for previous feature values 226 can be omitted, and only the TTL for previous score 224 is compared with current time 214 to determine whether or not previous score 224 has expired. In a third example, feature cache 236 and/or store cache 238 include local caches on hosts on which an instance of analysis apparatus 204 and/or processing apparatus 206 execute or distributed caches that are accessed by all instances of analysis apparatus 204 and/or processing apparatus 206 within the same data center, cluster, and/or collocation center. When feature cache 236 and/or store cache 238 include a local cache, a "sticky routing" technique is used to ensure that a series of scoring requests that include one or more of the same parameters 208 is sent to the same host to allow the host to process the scoring requests using cached scores, feature values, and/or encodings of the feature values related to those parameters 208.

Third, the importance of features used by the machine learning model can be determined using various techniques. For example, the effect of features on the output or performance of the machine learning model can be determined via recursive feature elimination, measures of correlation between individual features and the output, using node impurities of a tree-based model to calculate feature importance, using a least absolute shrinkage and selection operator (lasso) with a regression model to identify important features, and/or training an interpretable model to approximate the predictions of the machine learning model.

Figure 3:
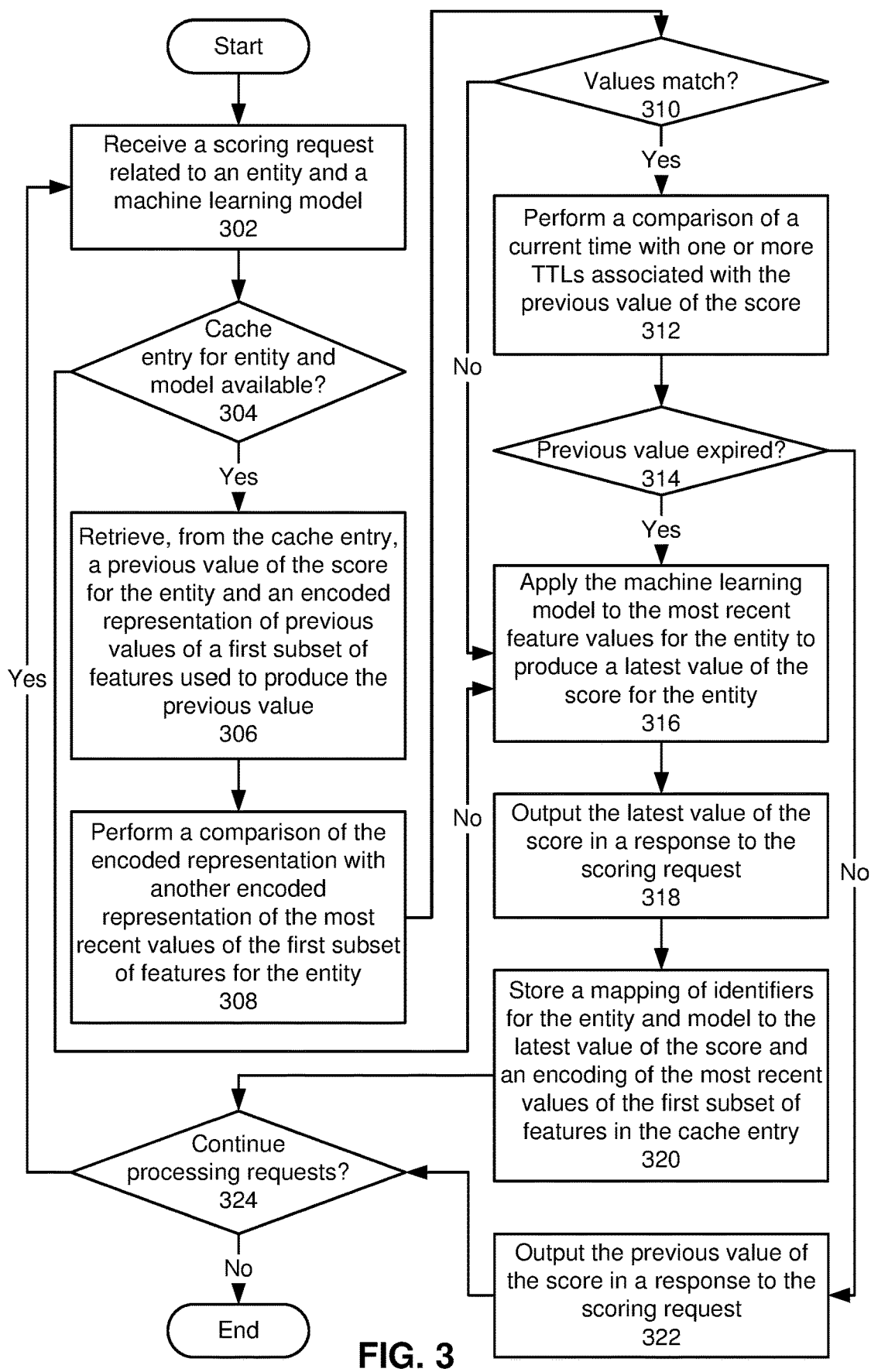
FIG. 3 shows a flowchart illustrating the processing of a scoring request in accordance with the disclosed embodiments.

FIG. 3 shows a flowchart illustrating the processing of a scoring request in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, a scoring request related to an entity and a machine learning model is received (operation 302). For example, the scoring request is generated in response to recent activity in an online system by the entity (e.g., a user). The scoring request includes one or more identifiers for the entity, one or more additional entities (e.g., jobs, goods, services, content, etc) associated with the recent activity, and/or the machine learning model.

The scoring request is processed based on an availability of a cache entry for the entity and machine learning model (operation 304). For example, the availability of the cache entry is determined by performing a lookup of a local or distributed cache using identifiers for the entity and/or machine learning model. A cache entry exists for the entity and model if a score for the entity was previously calculated by the machine learning model in response to a previous scoring request involving the same entity and machine learning model. Conversely, the cache entry for the entity and model does not exist if the entity and model do not have any previous scoring requests and/or if a previous cache entry for the entity and model has been invalidated.

If the cache entry for the entity and model is not available, the machine learning model is applied to the latest features for the entity to produce a latest value of the score for the entity (operation 318), and the latest value of the score is outputted in a response to the scoring request (operation 320). A mapping of identifiers for the entity and model to the latest value of the score and an encoding of the latest values of the first subset of features is also stored in the cache entry (operation 322), which allows the cache entry to be retrieve in response to a lookup that includes the identifier for the entity and/or machine learning model.

If the cache entry for the entity and model is available (e.g., if the entity's identifier can be matched to the cache entry), a previous value of the score for the entity and an encoded representation of previous values of a first subset of features used to produce the previous value are retrieved from the cache entry (operation 306). The previous value of the score may be generated by the machine learning model before the current time from the previous values of the first subset of features and additional features related to the entity. The encoded representation includes a hash value, embedding, checksum, and/or another type of encoding of a concatenation of the previous values of the first subset of features. The first subset of features includes features identified to have greater than a threshold effect on the performance of the machine learning model (e.g., based on permutations of the first subset of features in validation data for the machine learning model). For example, the first subset of features include a prespecified number and/or percentage of features with the largest impact on the output or error of the machine learning model.

Next, a comparison of the previous values of the first subset of features with the latest values of the first subset of features for the entity is performed (operation 308) to determine whether or not the latest values match the previous values (operation 310). For example, the most recent values of the first subset of the features for the first entity are retrieved from a feature store at the current time, and a hash of the most recent values is calculated. The hash is then compared with the hash of the previous values of the same features from the cache entry for equality. If the hashes are equal, the latest values are determined to match the previous values. If the hashes are not equal, the latest values do not match the previous values.

If the comparison indicates that the most recent values of the first subset of features for the entity differ from the previous values of the first subset of features for the entity, a new score is calculated for the entity, outputted in a response to the scoring request, and stored with the encoding of the latest values of the first subset of features in the cache entry for the entity (operations 316-320). If the comparison indicates that the most recent values do not differ from the previous values, a comparison of a current time with one or more TTLs associated with the previous value of the score is performed (operation 312) to determine whether or not the previous value of the score has expired (operation 314). For example, the TTLs include a TTL for the previous value of the score and/or one or more TTLs for previous values of a second subset of features used to calculate the score (e.g., features that have a lower effect on the performance of the machine learning model than the first subset of features).

If the current time exceeds any of the TTLs, the previous value of the score has expired. As a result, a latest value of the score is generated by the machine learning model (operation 316), outputted in a response to the scoring request (operation 318), and stored in the cache entry with the encoding of the latest values of the first subset of features (operation 320). If the current time does not exceed any of the TTLs, the previous value of the score has not expired, and the previous value of the score is outputted in a response to the scoring request (operation 322).

Operations 302-322 may be repeated during processing of requests (operation 324) for scores related to various entities and/or machine learning models. For example, operations 302-322 may be used to process online scoring requests for scores produced by the machine learning models for various types and/or combinations of entities.

Figure 4:
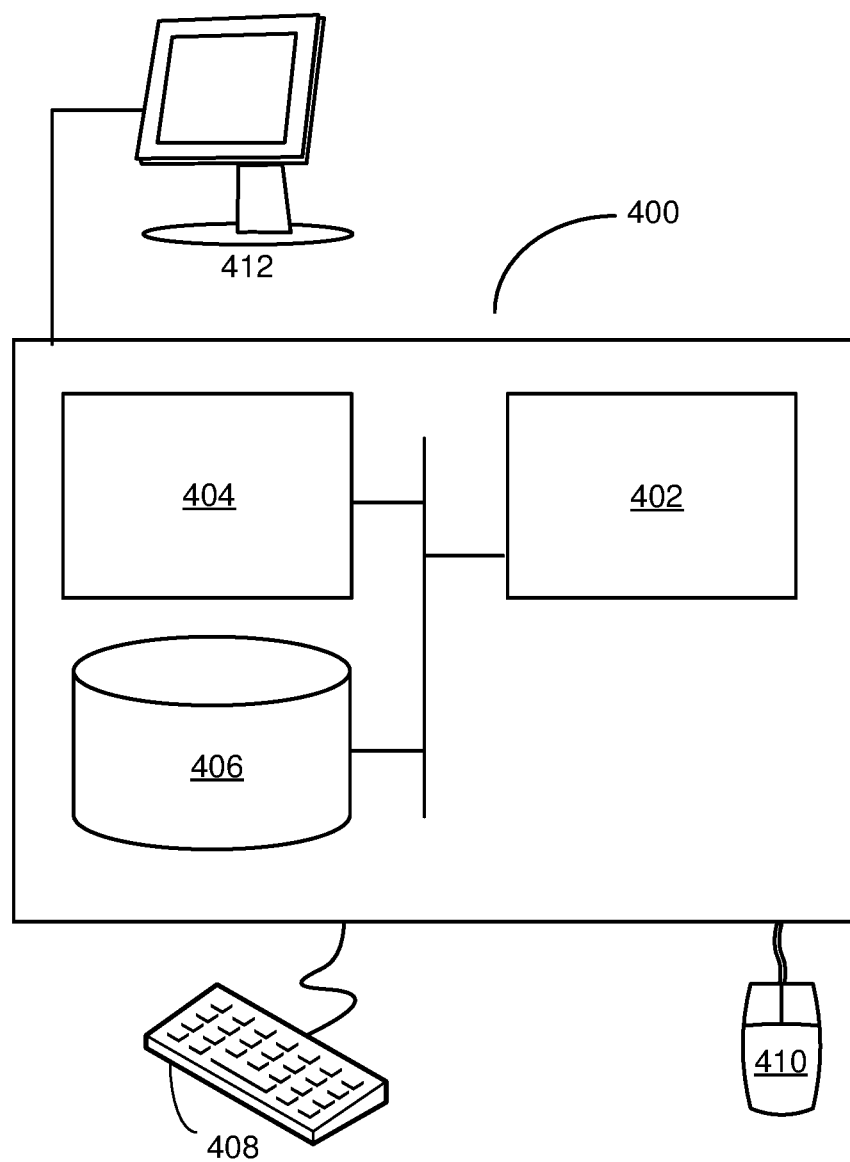
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Memory 404 includes a score cache (e.g., score cache 238 of FIG. 2) and a feature cache (e.g., feature cache 236 of FIG. 2). Entries in the score cache include mappings of entity identifiers to previous scores calculated for the corresponding entities (e.g., users, jobs, etc.), and entries in the feature cache include mappings of entity identifiers to previous feature values used to calculate the previous scores for the corresponding entities. Computer system 400 may also include input/output (I/O) devices such as a keyboard 408, a mouse 410, and a display 412.

Computer system 400 includes functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications obtain the use of hardware resources on computer system 400 from the operating system, as well as interact with the user through a hardware and/or software framework provided by the operating system.

In one or more embodiments, computer system 400 provides a system for processing scoring requests. The system includes an analysis apparatus and a processing apparatus, one or more of which may alternatively be termed or implemented as a module, mechanism, or other type of system component. The analysis apparatus matches an identifier for an entity in a scoring request to a cache entry in a score cache. Next, the analysis apparatus retrieves, from the cache entry, a previous value of a score generated by a machine learning model before a current time from previous values of a set of features for the entity and a first encoded representation of the previous values of a subset of the features with greater than a threshold effect on generation of the score by the machine learning model. The analysis apparatus also retrieves the most recent values of the first subset of the features for the first entity from a feature store at the current time and performs a comparison of the first encoded representation with a second encoded representation of the most recent values of the subset of the features for the entity. When the comparison indicate that the most recent values of the subset of features match the previous values of the subset of features and that the previous value of the score is valid, the processing apparatus outputs the previous value of the score in a response to a scoring request related to the entity and the machine learning model.

When the comparisons indicate that that the most recent values and previous values of the subset of features do not match and/or the previous value of the score has expired, the processing apparatus applies the machine learning model to the latest values of the set of features for the entity to produce a latest value of the score for the entity. The processing apparatus then outputs the latest value of the score in the response.

In addition, one or more components of computer system 400 may be remotely located and connected to the other components over a network. Portions of the present embodiments (e.g., analysis apparatus, processing apparatus, feature store, feature cache, score cache, data repository, online network, etc.) may also be located on different nodes of a distributed system that implements the embodiments. For example, the present embodiments may be implemented using a cloud computing system that processing scoring requests for a set of remote users or entities.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
matching an identifier for a first entity in a first scoring request to a cache entry in a score cache;
retrieving, from the cache entry:
a previous value of a score generated by a machine learning model before a current time from previous values of a set of features for the first entity; and
a first encoded representation of the previous values of a first subset of the features with greater than a threshold effect on generation of the score by the machine learning model;
retrieving most recent values of the first subset of the features for the first entity from a feature store at the current time;
performing a first comparison of the first encoded representation with a second encoded representation of the most recent values of the first subset of the features for the first entity;
when the first comparison indicates that the most recent values of the first subset of features for the first entity match the previous values of the first subset of features for the first entity, outputting the previous value of the score for the first entity in a first response to the first scoring request; and
storing, in another cache entry for a second entity, a mapping of an identifier for the second entity to a latest value of a score for the second entity and an encoding of the most recent values of a first subset of features for the second entity.

2. The method of claim 1, further comprising:
verifying, based on a second comparison of the current time with one or more times-to-live (TTLs) associated with the previous value of the score for the first entity, that the previous value of the score for the first entity has not expired prior to including the previous value of the score for the first entity in the first response.

3. The method of claim 2, wherein the one or more TTLs comprise at least one of:
a first TTL for the previous value of the score; and
a second TTL for one or more of the previous values of a second subset of features for the first entity inputted into the machine learning model to produce the previous value of the score.

4. The method of claim 2, wherein the one or more TTLs comprise a TTL for one or more of the previous values of a second subset of the features for the first entity inputted into the machine learning model to produce the previous value of the score.

5. The method of claim 1, further comprising:
performing a second comparison of the previous values of the first subset of features for a second entity with the most recent values of the first subset of features for the second entity;
when the second comparison indicates that the most recent values of the first subset of features for the second entity do not match the previous values of the first subset of features for the second entity, applying the machine learning model to the most recent values of the set of features for the second entity to produce a latest value of the score for the second entity; and
outputting the latest value of the score for the second entity in a second response to a second request related to the second entity and the machine learning model.

6. The method of claim 1, further comprising:
performing a second comparison of previous values of a first subset of features for the second entity with the most recent values of the first subset of features for the second entity;

when the second comparison indicates that the most recent values of the first subset of features for the second entity match the previous values of the first subset of features for the second entity, performing a third comparison of a current time with one or more times-to-live (TTLs) associated with the previous value of the score for the second entity;

when the third comparison indicates that the previous value of the score for the second entity has expired, applying the machine learning model to the most recent values of the set of features for the second entity to produce the latest value of the score for the second entity; and outputting the latest value of the score for the second entity in a second response to a second request related to the second entity and the machine learning model.

7. The method of claim 1, further comprising:
identifying the first subset of features as having a large effect on the performance of the machine learning model based on permutations of the first subset of features.

8. The method of claim 1, wherein matching the identifier for a first entity in the first scoring request to the cache entry in the score cache comprises:
performing a lookup of the score cache based on the identifier for the first entity and an additional identifier for the machine learning model.

9. The method of claim 1, wherein the score cache comprises at least one of:
a local cache; and
a distributed cache.

10. The method of claim 1, wherein performing the first comparison of the first encoded representation with the second encoded representation of the most recent values of the first subset of features for the first entity comprises:
obtaining a first hash of the previous values of the first subset of features for the first entity from the encoded representation;
calculating, as the second encoded representation, a second hash of the most recent values of the first subset of features for the first entity; and
comparing the first and second hashes.

11. The method of claim 1, wherein the first entity comprises at least one of:
a user; and
a job.

12. A system, comprising:
one or more processors; and
memory storing instructions that, when executed by the one or more processors, cause the system to:
match an identifier for a first entity in a first scoring request to a cache entry in a score cache;
retrieve, from the cache entry:
a previous value of a score generated by a machine learning model before a current time from previous values of a set of features for the first entity; and
a first encoded representation of the previous values of a first subset of the features with greater than a threshold effect on generation of the score by the machine learning model;
perform a first comparison of the first encoded representation with a second encoded representation of most recent values of the first subset of the features for the first entity;
when the first comparison indicates that the latest values of the first subset of features for the first entity match the previous values of the first subset of features for the first entity, output the previous value of the score for the first entity in a first response to the first scoring request; and
store, in another cache entry for a second entity, a mapping of an identifier for the second entity to a latest value of a score for the second entity and an encoding of the most recent values of a first subset of features for the second entity.

13. The system of claim 12, wherein the memory further stores instructions that, when executed by the one or more processors, cause the system to:
verify, based on a second comparison of a current time with one or more times-to-live (TTLs) associated with the previous value of the score for the first entity, that the previous value of the score has not expired prior to including the previous value of the score for the first entity in the first response.

14. The system of claim 13, wherein the one or more TTLs comprise at least one of:
a first TTL for the previous value of the score; and
a second TTL for one or more of the previous values of a second subset of features for the first entity inputted into the machine learning model to produce the previous value of the score.

15. The system of claim 12, wherein the memory further stores instructions that, when executed by the one or more processors, cause the system to:
perform a second comparison of the previous values of the first subset of features for a second entity with the most recent values of the first subset of features for the second entity;
when the second comparison indicates that the most recent values of the first subset of features for the second entity do not match the previous values of the first subset of features for the second entity, apply the machine learning model to the most recent values of the set of features for the second entity to produce a latest value of a score for the second entity; and
output the latest value of the score for the second entity in a second response to a second request related to the second entity and the machine learning model.

16. The system of claim 12, wherein retrieving the cached representation of the previous values of the first subset of features for the first entity comprises:
matching identifiers for the first entity and the machine learning model from the first scoring request to an entry in a cache; and
reading the cached representation from the entry.

17. The system of claim 12, wherein performing the first comparison of the previous values of the first subset of features for the first entity with the latest values of the first subset of features for the first entity comprises:
obtaining a first hash from the previous values of the first subset of features for the first entity from the cached representation;
calculating a second hash from the latest values of the first subset of features for the first entity; and
comparing the first and second hashes.

18. A non-transitory computer-readable storage medium storing instructions that when executed by a computer cause the computer to perform a method, the method comprising:
matching an identifier for a first entity in a first scoring request to a cache entry in a score cache;
retrieving, from the cache entry:
a previous value of a score generated by a machine learning model before a current time from previous values of a set of features for the first entity; and a first encoded representation of the previous values of a first subset of the features with greater than a threshold effect on generation of the score by the machine learning model;

performing a first comparison of the first encoded representation with a second encoded representation of most recent values of the first subset of the features for the first entity;

when the first comparison indicates that the most recent values of the first subset of features for the first entity match the previous values of the first subset of features for the first entity, outputting the previous value of the score for the first entity in a first response to the first scoring request; and storing, in another cache entry for a second entity, a mapping of an identifier for the second entity to a latest value of a score for the second entity and an encoding of the most recent values of a first subset of features for the second entity.

19. The non-transitory computer-readable storage medium of claim 18, the method further comprising:

performing a second comparison of the previous values of the first subset of features for a second entity with the most recent values of the first subset of features for the second entity;

when the second comparison indicates that the most recent values of the first subset of features for the second entity do not match the previous values of the first subset of features for the second entity, applying the machine learning model to the latest values of the first subset of features for the second entity to produce a latest value of the score for the second entity; and outputting the latest value of the score for the second entity in a second response to a second request related to the second entity and the machine learning model.

* * * * *